UNITED STATES PATENT OFFICE.

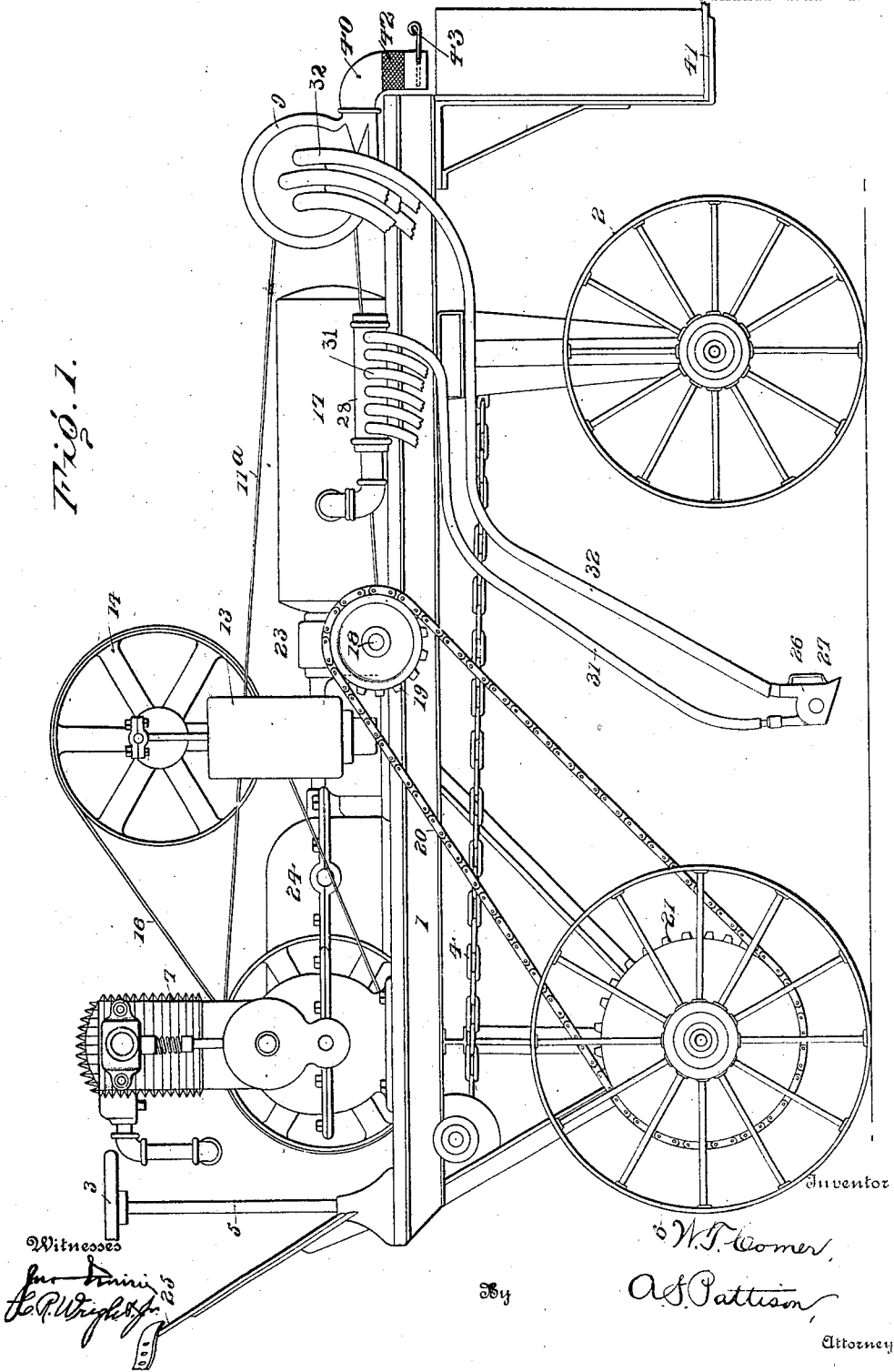

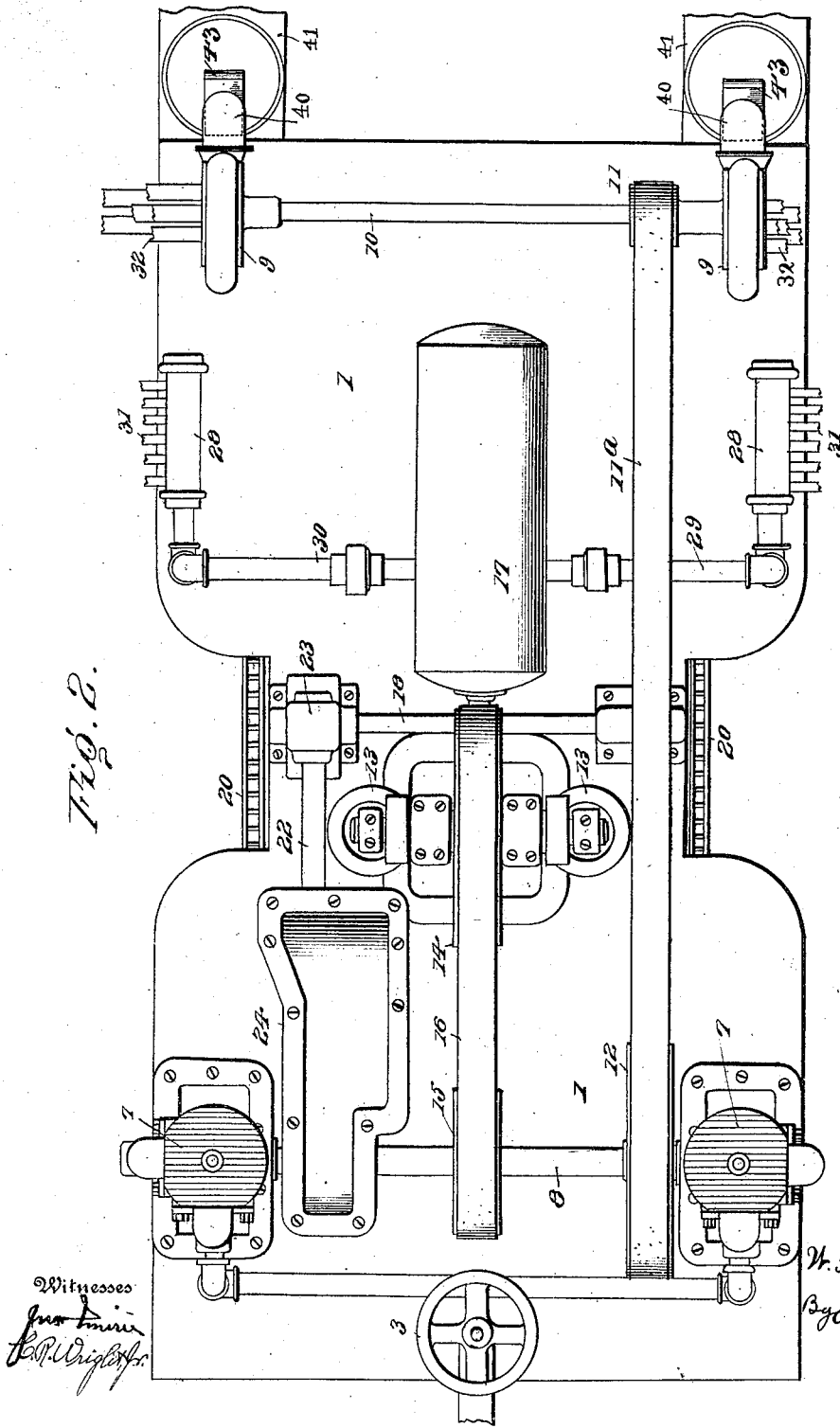

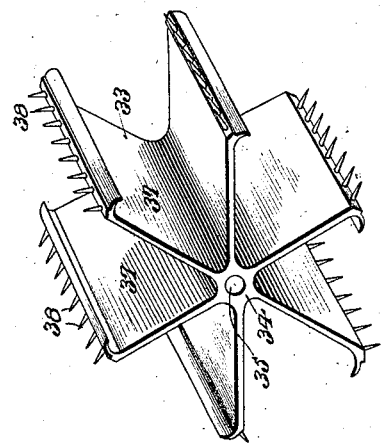
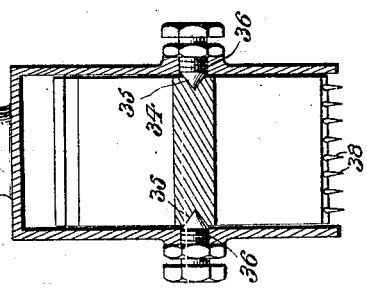
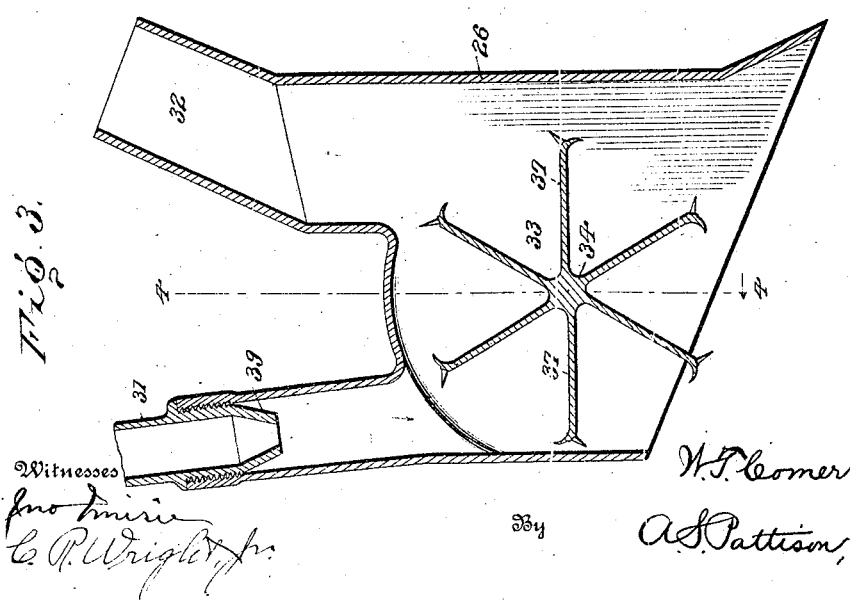

WILLIAM T. COMER, OF ATLANTA, GEORGIA.

COTTON-HARVESTER.

948,846. Specification of Letters Patent. Patented Feb. 8, 1910.

Application filed February 21, 1908. Serial No. 417,079.

*To all whom it may concern:*

Be it known that I, WILLIAM T. COMER, a citizen of the United States, residing at Atlanta, in the county of Fulton and State of Georgia, have invented certain new and useful Improvements in Cotton-Harvesters, of which the following is a specification, reference being had therein to the accompanying drawing.

This invention relates to improvements in cotton harvesters, which is designed to effect a semi-automatic harvesting of cotton by the use of compressed air and suction acting conjointly upon a specially constructed picker-head and picker, by which the cotton is detached from the boll and conveyed through a suitable passage or tube to any convenient or desirable receptacle, the mechanism being so constructed and arranged that the picking power propels the harvester through, over and among the cotton plants.

In the accompanying drawings, Figure 1, is a side elevation of a harvester embodying my invention. Fig. 2, is a top plan view thereof. Fig. 3, is a longitudinal section through the picker-head, taken at right angles to the axis of the rotatable picker. Fig. 4, is a section on line 4—4 of Fig. 3, looking in the direction of the arrow. Fig. 5, is a detached perspective of the rotatable picker.

In carrying out my invention, I provide a motor vehicle upon the frame or platform 1 of which is mounted the propelling and picking power, together with their coöperating parts. This platform is supported at its front end by means of suitable steering wheels 2 which are controlled by a steering wheel 3, through the medium of a chain 4 operatively connected with the shaft 5 of the steering wheel in any desired manner. The rear end of the machine is supported upon suitable propelling wheels 6, and these propelling wheels are driven in the manner to be presently explained.

Mounted upon the platform, preferably at its rear end, is one or more portable engines 7, preferably of the gasolene air-cooled type, and these engines are located at opposite sides of the rear end of the vehicle, and have a common crank-shaft 8 extending across the vehicle and connected with the pistons of the engine in the well known way.

Mounted upon the front end of the vehicle is one or more exhaust or suction fans or devices 9. Preferably there are two of such devices, and they are located at opposite sides of the front end of the vehicle for a purpose which will appear hereinafter. A driving shaft 10 for these exhaust or suction devices 9 extends across the vehicle and has its ends connected with the exhausting device, and this shaft carries a suitable pulley 11 which is operatively connected by means of a belt 11ª with a relatively larger pulley 12 carried by the engine shaft 8, whereby the suction devices are given a rapid rotation. Mounted upon the platform or frame of the vehicle, preferably at a point between the engines and the suction devices, is an air compressor 13, of any suitable and desired type, but here shown of the reciprocating form, and this air compressor is operatively connected by means of its pulley 14 with a pulley 15 of the engine shaft through the medium of a belt 16. The compressor 13 forces the air into an air-receiving or compression tank 17, from which the compressed air passes to the picking devices in a manner which will be hereinafter described.

A propelling shaft 18 extends across the vehicle approximately at its center, and carries on opposite ends the sprockets 19, which are operatively connected by means of chains 20 with the sprocket wheels 21 which are secured to the driving wheels 6. This propelling shaft is operatively connected with a shaft 22 by means of the well known worm gear which is located in a suitable housing 23, and the opposite end of the shaft 22 is connected with the engine-shaft by means of suitable gearing located within a gear-box 24, the construction being such that the propelling wheels 6 are slowly rotated. A suitable seat 25 is located adjacent the steering wheel 3 for the person who is to guide the vehicle.

The arrangement of the parts is such that a plurality of picking devices 26 are located at each side of the vehicle, and these picking devices are provided with suitable handles 27 by means of which the operator can carry the picker to the boll or bolls to be picked. The particular construction and operation of this picker will be presently explained.

Located at each side of the vehicle is what may be termed a compressor head 28, and these compressor heads are in communication with the compressed air receiver 17 by means of pipes 29 and 30. Extending from and in communication with these compressor heads 28 are a plurality of flexible tubes 31, the number of tubes corresponding with the number of pickers, and projecting from each of the suction devices 9 are a plurality of flexible tubes 32 which correspond in number to the number of tubes communicating with the compressors 28. A compressor tube 31, and a suction tube 32 are connected with the picker 26, to provide an air blast and a suction to each of the pickers 26 in the manner which will be now explained.

Having reference now particularly to Figs. 3 to 5 inclusive, which illustrate the picker on an enlarged scale, as compared with that shown in Fig. 1, it will be seen that the lower end of the picker-head 26 is open, and that located within this picker-head is a rotatable picking device or wheel 33. As illustrated herein, this rotatable picking device consists of an axis 34 which has cone-shaped recesses 35 receiving the cone-shaped bearings 36 which are adjustable through the wall of the picker-head 26. Radiating from the axis 34 are a suitable number of picker-blades 37 which carry on their ends suitable picker teeth 38, and just back of these picker teeth 38 the blades are preferably curved, as shown, to form air-pockets into and against which the compressed air is directed. By reference to Fig. 3, it will be seen that the compressed air is tangentially directed against the blades of this picker at one side of its axis, through a suitable nozzle 39, and that the suction through the tube 32 acts tangentially on the picker at the opposite side of its axis. This picker wheel is actuated and propelled by the combined action of a positive blast of air received under pressure at one side of its axis, and by the action of the draft of suction at the opposite side of its axis. By reference to Fig. 3 it will be observed that the edges of the blades which carry the picking teeth move upward through the peripheral arc at the outer end of the picker case, engaging the cotton and carrying it upward into the case and over to the mean center of suction, at which point the cotton is cleared or removed from the teeth of the wheel by the force of suction and carried through the flexible suction tube to and through the exhauster 9 and escapes therefrom through the outlet tube 40 which is located just above a suitable step or platform 41 upon which a person may stand with a bag or other receptacle to receive the cotton, or upon which a suitable receptacle for the cotton may be supported.

I desire it understood that the suction devices and compressors may be operated singly or in couples, and that the number and size thereof will depend upon the capacity of the apparatus in which they are to be incorporated.

I am aware that the broad principle of cotton picking by blast and suction through picker heads applied by manual direction is known in this art, but in such instance the arrangement of the parts has not been that here shown, nor has the blast and suction been applied in the manner which I have herein shown and described, and by means of which I have effected a highly practical picking mechanism which is found in actual practice to be extremely effective.

Having thus described my invention, what I claim and desire to secure by Letters Patent, is:—

1. A cotton picker comprising a picker case, a rotatable picker therein, and means for delivering a blast of air at one side of the axis of the picker, and a suction draft at the opposite side of its axis.

2. A cotton picker comprising a picker case, a rotatable picker therein, and means for delivering a blast of air tangentially thereto at one side of the picker axis, and a suction draft arranged tangentially thereto at the other side of its axis.

3. A cotton picker comprising a picker case having an open outer end, a picker wheel journaled therein and carrying picker-teeth at its periphery, the case having a blast air passage arranged at one side of the axis of the wheel, an air blast producing means for said opening, a separate suction opening at the opposite side of the axis of the wheel, and a suction producing means for said suction opening.

4. A cotton picker comprising a casing, a picker wheel therein, said casing having an open outer end and two openings in its inner portion arranged in a line transverse and at opposite sides of the axis, of said wheel, and means for causing suction through one opening and an air blast through the other opening.

5. A cotton picker comprising a vehicle, a motor and air compressor mounted thereon and operatively connected, a compressed air-receiving chamber mounted thereon, a compressed air distributing head having communication with said chamber, a plurality of picker tubes separately connected with said head, the outer ends of the tubes being open, and revolving pickers located in the open ends of the tubes and operated by compressed air.

6. A cotton picker comprising a vehicle, an air compressor, separate compressor heads located at opposite sides of said vehicle, separate air exhausters located at opposite sides of the vehicle, picker casings and a
5 picker-wheel located within each casing and transversely journaled therein, the casings having compressor and exhaust openings arranged at opposite sides of the axis of the picker-wheels and in communication respectively with the compressors and exhausters 10 at their respective sides of the vehicle for the purpose described.

In testimony whereof I affix my signature in presence of two witnesses.

WILLIAM T. COMER.

Witnesses:
   T. I. VOGT,
   C. N. BERGSTROM.